Jan. 1, 1963 S. C. KITSOPOULOS 3,071,727

BANDWIDTH REDUCTION SYSTEM

Filed May 8, 1961 4 Sheets-Sheet 1

INVENTOR
S. C. KITSOPOULOS
BY D. V. De Simone
ATTORNEY

INVENTOR
S. C. KITSOPOULOS
BY D. V. De Simone
ATTORNEY

Jan. 1, 1963 S. C. KITSOPOULOS 3,071,727

BANDWIDTH REDUCTION SYSTEM

Filed May 8, 1961 4 Sheets-Sheet 3

INVENTOR
S. C. KITSOPOULOS
BY D. V. De Simone
ATTORNEY

INVENTOR
BY S.C. KITSOPOULOS
D. V. De Simone
ATTORNEY 3,071,727

BANDWIDTH REDUCTION SYSTEM

Sotirios C. Kitsopoulos, Summit, N.J., assignor to Bell Telephone Laboratories, Incorporated, New York, N.Y., a corporation of New York Filed May 8, 1961, Ser. No. 108,482
11 Claims. (Cl. 325—44)

This invention relates to communication systems. In particular, it concerns the processing of signals so that they may be more efficiently conveyed from one point to another.

Let us suppose that over a specified transmission facility we wish to convey—and thereafter reconstitute successfully—as many as possible of a variety of messages. We would want to process each of these messages in a way that would permit the most efficient use of our overburdened transmission path. Such preparation of the message requires knowledge of its nature and the extent to which imperfections can be tolerated by the ultimate user. Take television messages, for example. They are among the most demanding on transmission channel capacity—so much so that the investment in equipment capable of transmitting them exceeds the total investment in plant of all television broadcasters. Let us consider the nature of the television message and the extent to which it can be compromised.

In brief, a still picture in black and white may be expressed as a variation in luminance over a two-dimensional field. In a moving picture, luminance also varies with time so that it is a function of three independent variables. We may use an electric signal to represent this function. Since the amplitude of a signal is itself a function of time, at any instant the signal will represent the luminance at a particular point in the two-dimensional field. This takes care of one of the independent variables; namely, time. But in order to translate the entire field, we must account for the two spatial variables, and so we scan the field.

The bandwidth required for the resultant television signal—and we are now merely concerned with its analog form—is a function of the rate at which the field is scanned and the fineness of detail with which it is to be reproduced. Important components will appear at frequencies close to zero. The upper limit of an acceptable band is determined by subjective viewing tests. These tests show that an upper limit of approximately four megacycles is necessary for satisfactory performance.

The bandwidth requirements for the transmission of analog television signals are thus formidable enough. As the reader doubtless appreciates, digital transmission of these signals via pulse code modulation (PCM) requires even more bandwidth. In many cases the bandwidth demanded by PCM is a price willingly paid for its outstanding advantages; but the bargaining process must go on, and it is to a reduction of that price—i.e., to a reduction of the bandwidth needed for the PCM transmission of information such as television—that the present invention is directed. Many others have concerned themselves with this problem. For example, F. D. Covely, 3rd, in Patent No. 2,957,941, which issued October 25, 1960, proposes a fast-slow scanning method to reduce the bandwidth of a television signal.

Another example, more akin to the present invention, is the reduced bandwidth system of Patent No. 2,946,851, which issued to E. R. Kretzmer on July 26, 1960. In that system two modes of pulse code modulation, only one of which is transmitted at a time, are used to encode a television signal. Both modes require the same bandwidth in that they have the same basic repetition frequency or bit rate (a commonly employed term, which is proportional to the product of the sampling rate and the number of binary digits used to represent each sample). One mode, which is used to encode slowly-varying amplitudes that represent relatively uniform picture areas, calls for a sampling rate of, for example, one-half the normal rate specified by the sampling theorem (i.e., twice the highest significant message frequency) and the fine-grained quantization of the samples. The other mode, used to encode rapidly-varying amplitudes, representative of picture areas of fine detail, calls for the normal sampling rate and coarse-grained quantization of the samples. In both modes, the full amplitude of each sample is quantized and encoded.

It is an object of the present invention to conserve bandwidth in communications systems whose transmission capacities are heavily taxed. While conserving bandwidth, however, it is also an object of the present invention to enhance the fidelity with which information is reproduced in the bandwidth reduction system. Accordingly, while the present invention is directed to a reduction in the bandwidth requirements of information that is ordinarily slothful in its assessments on the frequency spectrum—viz., digital information—and thus to the efficient employment of available broadband transmission facilities so that more information dispatches can be accommodated at any one time, it is also directed to a more faithful reproduction of such information.

It is very briefly in accordance with the invention to process a video signal for PCM transmission in either of two ways. Which method is used is dependent upon the nature of the message signal at any given time. More specifically, the method employed is dependent on the rate of change of the signal. One method involves encoding of the full amplitude of samples of the signal, and will hereinafter be called the "slow-mode." By the other method, which will be identified as the "fast-mode," only the difference between the amplitudes of successive samples is encoded. The slow-mode involves fine-grained linear quantization and an effective sampling rate which is a submultiple of that normally used, since less than all of the samples taken from the message signal are encoded. In the illustrative embodiment to be described, this submultiple is one-half the normal rate. The slow-mode is used to process those samples which are relatively redundant in nature, i.e., that do not drastically depart in magnitude from one another. As to these samples, the properties of the human eye will make up for whatever information has been comprised—assuming that an adequate interpolation process (to be described below) is undertaken at the receiver. The fast-mode involves nonlinear, differential quantization and a normal sampling rate. It is used to process those samples that vary significantly in magnitude. The quantizer for this mode has a nonlinear (or tapered) quantizing characteristic, whose quantum levels are spaced so that quantization error increases with increasing amplitude, with the result that the quantizing error for low amplitude difference samples is reduced, while that for higher amplitude difference samples is increased. This is in accordance with the properties of the human visual mechanism.

The fidelity with which the video signal is ultimately reproduced is found to be enhanced in relation to prior bandwidth reduction systems; for the invention takes advantage of the fact that the eye is sensitive to small errors in substantially uniform picture areas, with respect to which the fine-grained quantization of the slowmode is employed, but not to errors at transition points (edges) or in areas of chaotic detail, for which the invention enlists the differential and nonlinear quantization of the fast-mode.

The invention will be better understood after a consideration of some illustrative embodiments.

Figure 1:
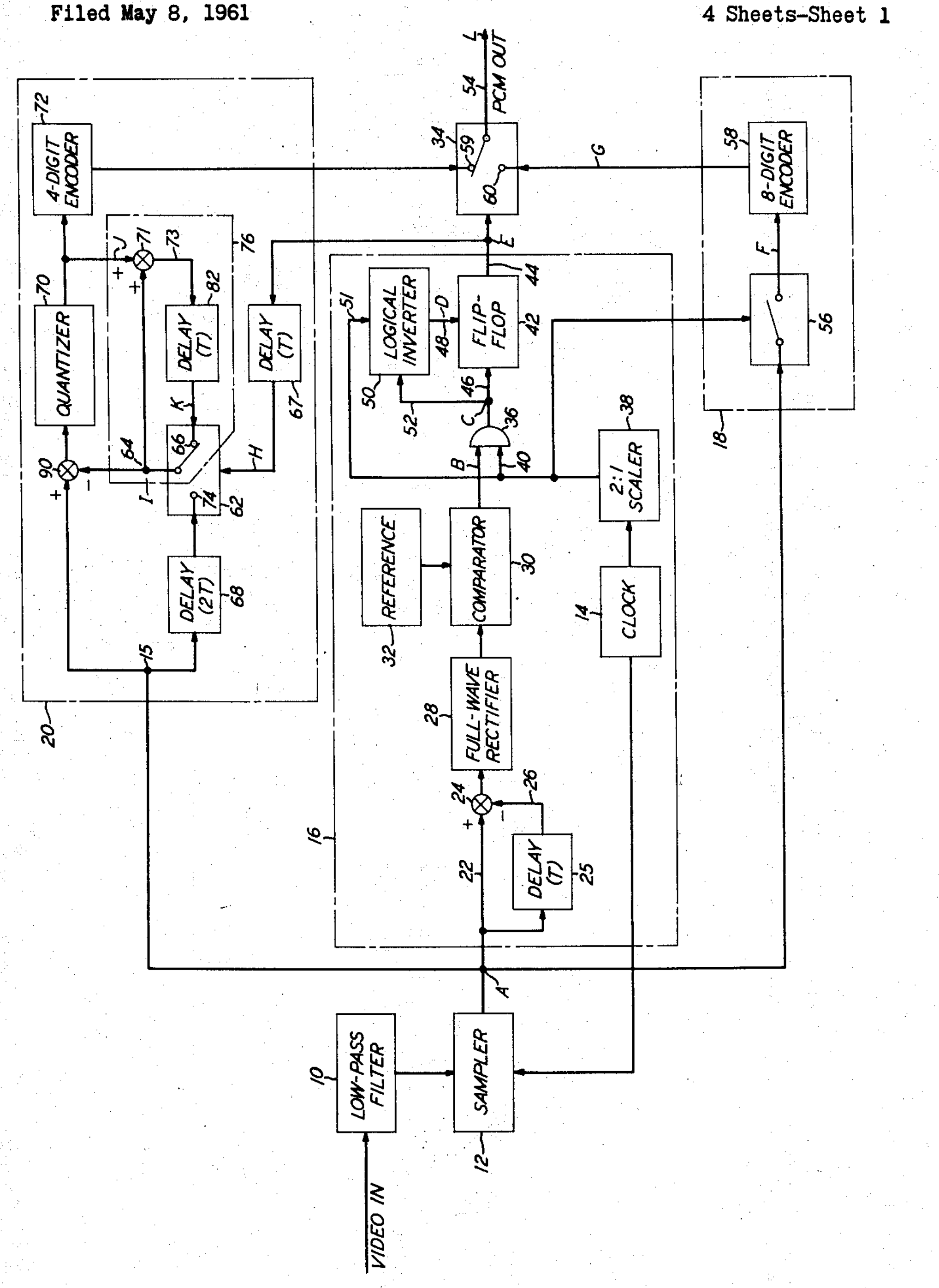
FIG. 1 is a block schematic diagram of a circuit for processing video signals in accordance with the invention.
Figure 2:
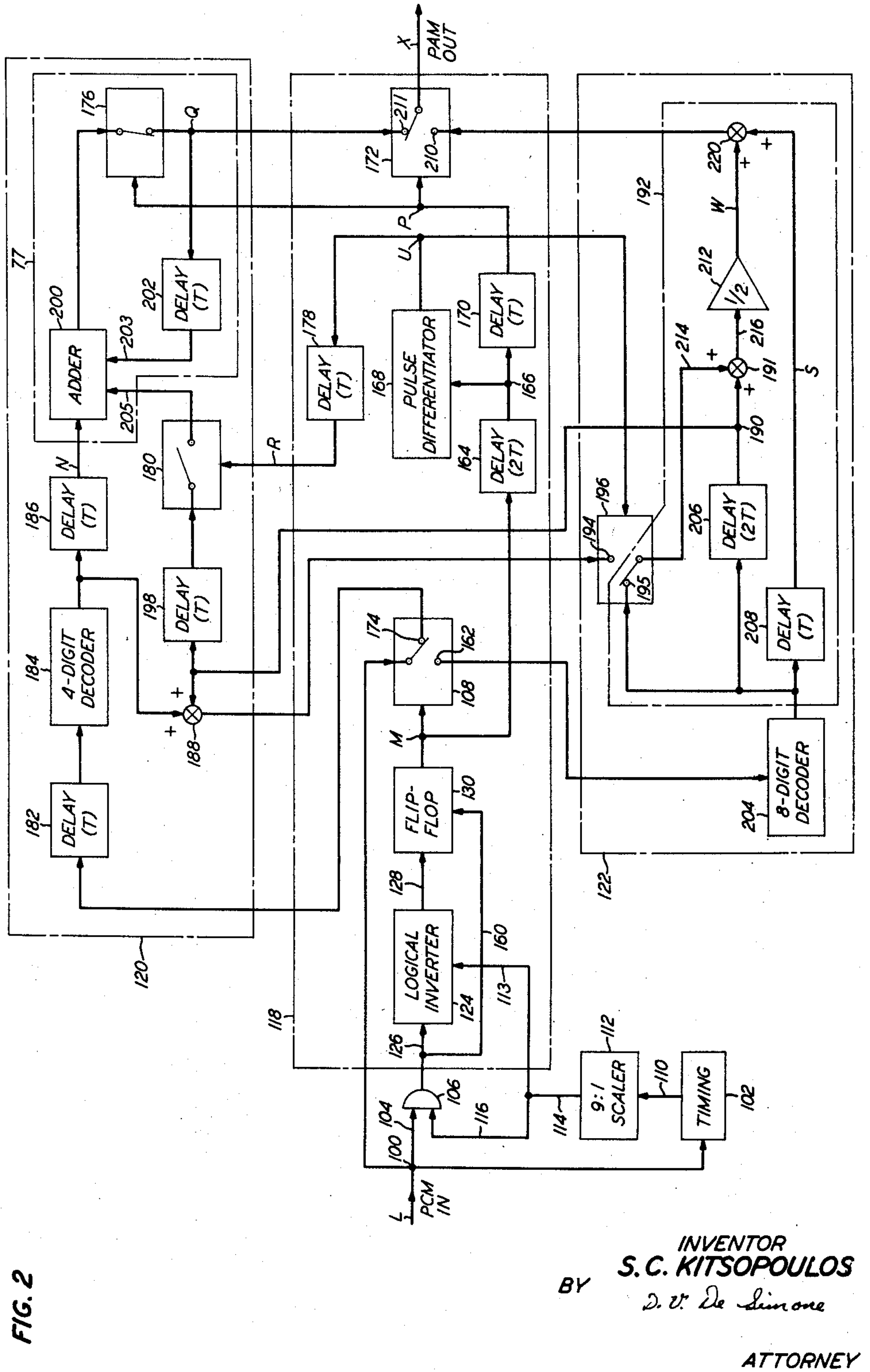
FIG. 2 is a block schematic diagram of a circuit for deprocessing the signals received from the circuit of FIG. 1.

Unless otherwise indicated, it will be asumed that all elements of FIGS. 1 and 2 are unilateral and perform their functions instantaneously. It should be noted that no amplifiers or limiters for reestablishing signal levels have been shown; nor has the error, inherent in quantization, been shown. In general, the pulse durations are less than one time slot. In most of the wave-forms of FIGS. 3 and 4, pulses are shown as solid vertical lines, and like elements have been given the same reference characters.

*The Transmitter of FIG. 1*

In FIG. 1, a video signal is fed into the low-pass filter 10, wherein it is band-limited. The sampler 12 samples the signal in the usual way, at a rate of at least twice the highest frequency passed by the filter 10. The clock 14 governs the sampler 12, and therefore determines the sampling instants. The sampler 12 supplies its samples to the point A, whence they proceed to three different portions of the circuit of FIG. 1: the control circuit 16, the slow-mode circuit 18, and the fast-mode circuit 20.

It is the function of the control circuit to decide whether a sample appearing at point A must be passed onto the transmission medium 54 by way of the fast-mode circuit 20 or by way of the slow-mode circuit 18. Both mode circuits continuously process samples supplied thereto, but only one supplies code pulses to the transmission medium 54 at any given time.

The slow-mode circuit 18 selects and encodes every other sample appearing at point A into an 8-digit code group. Each of these groups is prefaced by a mode digit to identify the mode. The fast-mode circuit 20, on the other hand, differentially quantizes every sample appearing at the point A and encodes it into a 4-digit code group. The 4-digit groups produced by the fast-mode circuit 20 are bunched together in pairs, each pair being prefaced by a mode digit to identify it.

Each of the mode digits mentioned above is shown in wave-form L of FIGS. 3 and 4, either as a dotted vertical line, representing the absence of a pulse (i.e., a binary "0") to identify the fast-mode, or as a solid vertical line, signifying a pulse (binary "1") to identify the slow-mode. The wave-form L of FIGS. 3 and 4 consists solely of the mode-identifying digits, the information-carrying digits having been omitted for the sake of simplicity.

We have very briefly outlined the operation of the circuit of FIG. 1. A detailed description of this circuit follows:

The difference between each sample and its next preceding neighbor (see the wave-form A of FIG. 3) is obtained by conveying samples from the point A to the inputs 22 and 26 of subtractor 24. Delay circuit 25 delays samples proceeding to the input 26 by one sampling interval T. From every sample, therefore, its immediate predecessor is subtracted.

The subtractor 24 supplies the difference samples it produces to the rectifier 28, wherein they are full-wave-rectified and compared, in comparator 30, with a reference voltage supplied by the source 32. This reference voltage is chosen to be a few percent of the range of the incoming video signal.

The comparator 30 produces a pulse at its output only if a difference sample exceeds the value of the reference voltage. As we shall see, when a difference sample so exceeds the reference voltage, the control circuit 16 will cause the output switch 34 to connect the switch terminal 59 to the transmission medium 54. The fast-mode circuit 20 can thus supply a pair of fast-mode pulse groups to the transmission medium 54. The switch 34 may be, for example, an electronic switch of any type well known in the art.

On the other hand, when a difference sample has an amplitude less than that of the reference voltage supplied by the source 32, the slow-mode circuit 18 will be enabled, and a slow-mode pulse group will be supplied to the switch 34.

Figure 3:
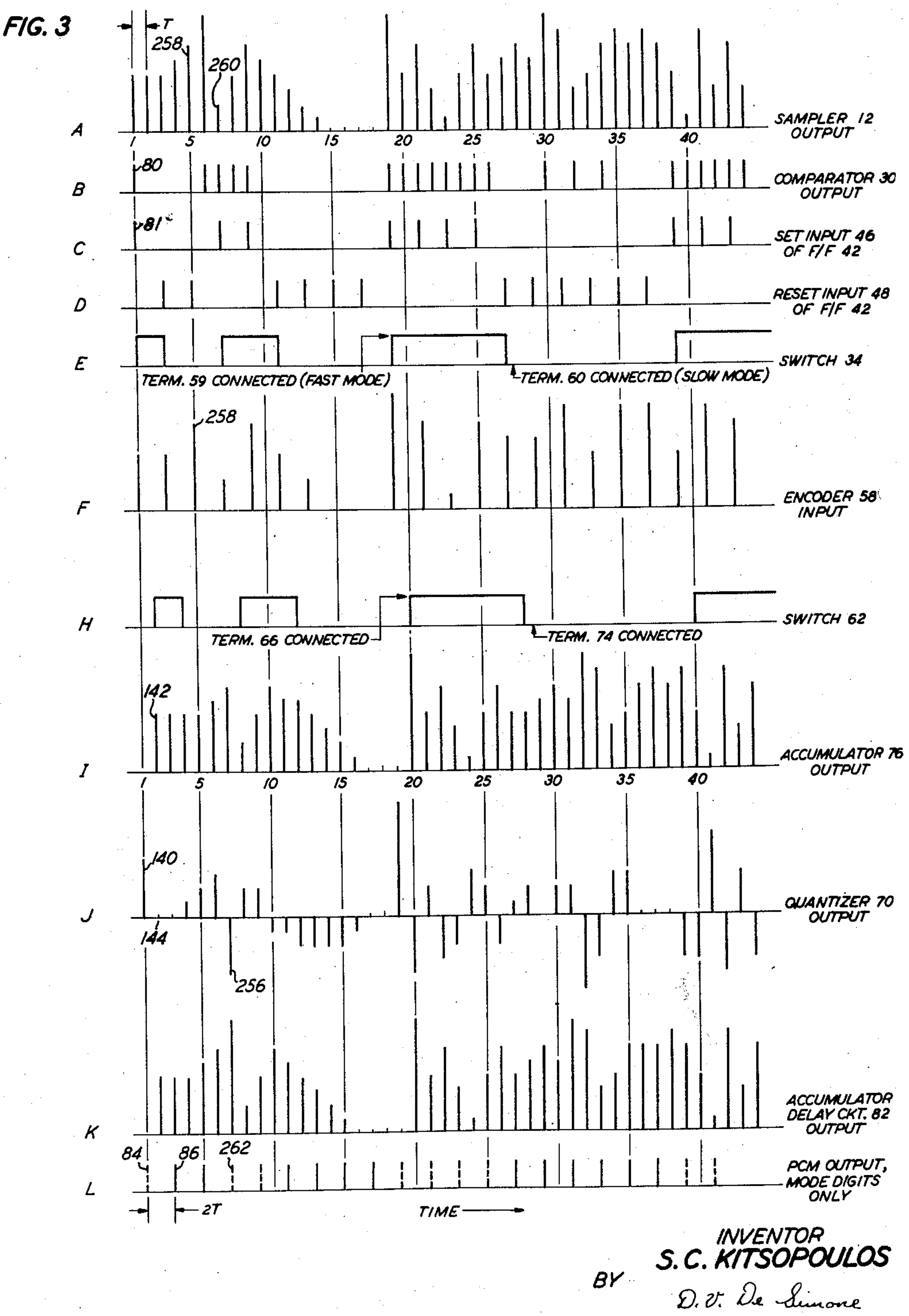
FIG. 3 is a timing diagram concerning various indicated points in the circuit of FIG. 1.

The wave-form B of FIG. 3 appears at the output of the comparator 30 and is supplied to the AND gate 36. The circuit 38 is a scaler (frequency divider) and reduces the frequency of the clock pulses emanating from the clock 14 by a factor of 2. Accordingly, pulses appear at the input 40 of AND gate 36 at one-half the sampling rate, or at intervals of 2T seconds. When the AND gate 36 is enabled by the simultaneous occurrence of a pulse in wave-form B and a clock pulse at the input 40, it will trigger the flip-flop circuit 42.

The output 44 of flip-flop circuit 42 switches from one state to another in response to trigger pulses from the AND gate 36. We shall call one of these states the binary "1" state, which corresponds to an enabling voltage level, and the other the binary "0" state. In the latter state, the voltage level of the output 44 is incapable of enabling associated devices. We shall assume that the output 44 of flip-flop circuit 42 is in the binary "0" state whenever the circuit 42 is in its normal state of equilibrium. When the output 44 is in the binary "1" state, its amplitude level is sufficient to operate the switch 34. When the output 44 is in the binary "1" state, it will remain in this state even though a trigger pulse is supplied to the flip-flop circuit 42 by the AND gate 36. Thus, the flip-flop circuit 42 will change its state of equilibrium, in response to a trigger pulse at its input 46, only if it is in its normal state of equilibrium.

The input 48 of flip-flop circuit 42 is a reset input, whose purpose it is to switch the flip-flop circuit 42 back into its normal state of equilibrium—i.e., that state of circuit 42 in which its output 44 is in the binary "0" state. When the output 44 is in this state, the switch 34 will be positioned to connect the slow-mode circuit 18 to the transmission medium 54. The reset operation is accomplished by means of the logical inverter 50, which supplies a reset pulse to the input 48 only when its input 52 is in the binary "0" state and, concurrently, its input 51 is enabled by the scaler 38. Because of the two-to-one scaler 38, the flip-flop circuit 42 can never be in either of its states for an interval of less than 2T (two sampling intervals). It should be noted that the logical inverter 50 is, in effect, an inhibit gate. Thus, its input 52 is the inhibit input. The presence of a pulse at this input would prevent the passage of a reset pulse from the scaler 38, through the logical inverter 50, to the reset input 48 of flip-flop circuit 42.

The wave-form supplied to the input 46 of flip-flop 42 and the input 52 of the logical inverter 50 is shown in FIG. 3 as the wave-form C. The ultimate effect of pulses in the wave-form C on the position of switch 34 is illustrated by wave-form E. Note that the first pulse of each pulse group in wave-form C sets the flip-flop circuit 42 in its abnormal state of equilibrium so that its output 44 is at its higher voltage level (binary "1" state), and therefore causes switch 34 to connect the transmission medium 54 to the fast-mode terminal 59, as shown in FIG. 1.

As can be seen in FIG. 3, reset pulses appear in the wave-form D only when no "set" pulses are present in wave-form C. Note the effect of these reset pulses on the voltage level of wave-form E. The first reset pulse of each pulse group causes switch 34 to connect its slow-mode terminal 60 to the transmission medium 54.

Since the flip-flop circuit 42 is indirectly under the control of the two-to-one scaler 38, it maintains either of its states of equilibrium for an even number of sampling intervals, as was indicated above in the discussion of the resetting of this circuit. Accordingly, the switch 34 will be connected to either the fast-mode circuit 20 or the slow-mode circuit 18 for at least two sampling intervals (2T). The reason the circuit is thus arranged is to allow the switch 34 to convey to the transmission medium 54 either two fast-mode groups of four digits each or one slow-mode group of eight digits.

The slow-mode circuit 18 comprises a transmission gate 56 operated by the two-to-one scaler 38, and an 8-digit encoder 58. The encoder 58, which may be of conventional design, includes means for timing its operations and means for quantizing the wave-form E (FIG. 3) into 256 levels. Each of these levels will be represented by a unique group of eight digits. As was previously indicated, slow-mode code groups produced in the circuit 18 are supplied to the output switch 34 only when the output 44 of flip-flop circuit 42 is in the binary "0" state, in which state the switch 34 connects the slow-mode terminal 60 to the transmission medium 54.

When a pulse from the scaler 38 closes the switch 56, a sample from the point A proceeds through the switch 56 to the 8-digit encoder 58. Consequently, as can be seen in the wave-form F of FIG. 3, only every other sample of the wave-form A is passed on to the encoder 58, wherein conversion to an 8-digit code word (prefaced by a mode digit) takes place. The mode digit, as was mentioned above, provides mode information for the receiver (FIG. 2). As was also mentioned previously, this mode digit, represented by a pulse, informs the receiver that the eight following digits are representative of a slow-mode code group. The absence of a pulse in the first time slot, as we have also seen, informs the receiver that the immediately following 8-digit group consists of two fast-mode groups.

The operation of the fast-mode circuit 20 will now be described. One sampling interval after the control circuit 16 has determined that fast-mode operation is called for, the switch 62 will connect the juncture 64 to the terminal 66. The delay is imposed by the delay circuit 67. Normally, the switch 62 connects the juncture 64 to the terminal 74.

Let us assume that the point A was at zero potential for several sampling intervals before the arrival of a first sample (we shall call it S1 for convenient reference) from the sampler 12, and that the sample S1 is of sufficient amplitude to require fast-mode processing. Let us also assume that at this starting time the output 44 of flip-flop 42 is in the binary "0" state, so that the switch 34 connects the transmission medium 54 to the terminal 60 for slow-mode operation, and the switch 62 connects the juncture 64 to the terminal 74. Since fast-mode processing is required, the control circuit 16 will, as we have seen, cause switch 34 to connect the transmission medium 54 to the terminal 34 (as shown).

Since our first sample S1 (every fifth sample position is numbered in the wave-form A of FIG. 3, as can be seen) calls for fast-mode encoding, the comparator 30 sends an impulse 80 of wave-form B to the AND gate 36, which, because it simultaneously receives an impulse from the scaler 38, generates an impulse 81 (wave-form C) and supplies this impulse to the logical inverter 50 and the flip-flop circuit 42. The output 44 of flip-flop circuit 42 is therefore switched to the binary "1" state. Accordingly switch 34 connects the transmission medium 54 to the fast-mode encoder 72. Fast-mode words may now be transmitted to the receiver of FIG. 2. These code words are identified by the mode label 84 in wave-form L of FIG. 3. The label in this instance is represented by the absence of a pulse and, thus, does not really exist. The interval between this label and the label 86 is 2T or two sampling intervals and, including the time slot which encompasses the mode label 84, consists of nine time slots. The first of these time slots thus embraces the mode label. The next four time slots embrace a code word corresponding to the difference between the first sample S1 and the sample that occurred 2T seconds before (which we assumed was of zero amplitude). The delay of two sampling intervals is provided by the delay circuit 68. The last four time slots embrace the code word corresponding to the difference between the second sample S2 and the first sample S1 of the wave-form A.

One sampling interval after the advent of our first sample S1—a delay imposed by the delay circuit 67—the switch 62 will connect the juncture 64 to the terminal 66, thereby completing the loop of the circuit 76, which will hereinafter be called the accumulator 76.

In the meantime—i.e, before the switch 62 completes the circuit of accumulator 76—our first sample S1 proceeds from the sampler 12 to the juncture 15, where it continues over two paths: one to the delay circuit 68, and the other to the subtractor 90. Now, since we have assumed that no sample preceded the sample S1, nothing is subtracted from the sample S1 in the subtractor 90 and sample S1 goes, intact, on to the quantizer 70.

It should be noted that, upon a slow- to fast-mode transistion, the first difference sample supplied to the quantizer 70 is the difference between the sample occurring at point A at the transition time and the last sample processed during the slow-mode cycle. This last sample occurred two sampling intervals before the advent of the sample at the slow-to-fast transition time. The result of the first subtraction process may thus be called a "double difference" sample. The delay of two sampling intervals is imposed by the delay circuit 68.

The reason for taking this double-difference sample at the subtractor 90 is that the sample that occurred one sampling interval before was not transmitted to the receiver of FIG. 2. Accordingly, at the receiver the first fast-mode sample can only be reconstructed by using the last slow-mode sample, which, as we have seen, occurs two sampling intervals before. It should be understood that the double-difference process occurs only at the beginning of each fast-mode cycle and only once during the cycle. All subsequent differences taken in the cycle are between adjacent samples.

The quantizer 70 may be of the type disclosed in Patent No. 2,956,157, which issued to R. E. Graham on October 11, 1960. For present purposes, it has a nonlinear or "tapered" quantizing characteristic that consists of sixteen levels, each of which is convertible into a 4-digit code by the encoder 72, which may be of a conventional design. The first sample S1, now quantized (see the first sample 140 of wave-form J), goes not only to the encoder 72, but also back to the subtractor 90 by way of the accumulator 76. The accumulator 76 is similar to the one described by R. E. Graham in "Predictive Quantizing of Television Signals," 1958, Institute of Radio Engineers WESCON Convention Record, Part 4, pages 147–157. The function of the accumulator is described in detail at page 148 of Graham's paper. Very briefly, it is the function of the accumulator 76 to produce, at the output 73 of the adder 71, a picture signal identical to the signal ultimately reconstructed at the receiver.

Since we assumed that the sample S1 was preceded by a zero level for several sampling intervals, the double-difference taken at the subtractor 90 is equal to S1. Continuing our observation of what happens to the first sample S1, we note that it is delayed one sampling interval by the delay circuit 82 and then appears at the juncture 64 as the sample 142 of wave-form I. The switch 62 was in a position to effect this conveyance to juncture 64, because the control signal from the output 44 of flip-flop circuit 42 had overcome the delay of delay circuit 67 and caused the switch 62 to connect the juncture 64 to the terminal 66. The subtractor 90 subtracts the sample 142 from the second sample S2 of wave-form A. The result is zero, as shown by the second sample position 144 of the wave-form J. This value is then converted to code by the encoder 72. It is also supplied to the accumulator 76 for a continuation of the accumulation process.

The encoder 72 divides the interval 2T of every two successive fast samples it receives into nine time slots. The first time slot is used to encompass mode information, which we have seen is a binary "0" to identify the fast-mode. When, at the input of the receiver of FIG. 2, the first time slot is unoccupied by a pulse, the receiver will understand that the following eight digits comprise two fast-mode code groups. Thus, the first and second samples of wave-form A follow, in code form (not shown), the fast-mode label 84 of wave-form L.

The third sample S3 of wave-form A will require slow-mode encoding, because it is of the same value as the second sample S2. Since difference samples supplied to the comparator 30 must exceed the reference level of reference 32 if the fast-mode is to be employed, the control circuit 16 will operate in the manner already described to see to it that the third sample S3 of wave-form A is conveyed to the transmission medium 54 by way of the slow-mode circuit 18.

As has already been explained, this cutover from fast-mode to slow-mode operation could not occur when the second sample S2 was produced—even though samples S1 and S2 were of the same amplitude—because the scaler 38 sees to it that at least two sampling intervals must lapse before a change in the state of equilibrium of flip-flop circuit 42 can take place and, hence, the position of the mode switch 62 can be altered. Consequently, the samples S1 and S2 were both fast-mode encoded, as is indicated by the fast-mode label digit 84 of wave-form L.

When the third sample S3 is fed into the control circuit 16, two sampling intervals have already lapsed since the scaler 38 emitted a pulse. It now emits another one, enabling the logical inverter 50 to reset the flip-flop circuit 42. Since the comparator 30 has determined that the samples S2 and S3 are insufficiently different in amplitude to call for fast-mode operation, the AND gate 36 will not be enabled. Consequently, scaler 38 having enabled the logical inverter 50, the binary "0" state of point C will cause the inverter 50 to supply a pulse to the reset input 48 of flip-flop circuit 42. The output 44 of this circuit therefore assumes the binary "0" state, and the switch 34 connects the transmission medium 54 to the terminal 60 for slow-mode encoding.

Meanwhile, the switch 56 has been enabled by the scaler 38, and the third sample S3 has been supplied to the encoder 58. The encoder 58, which combines the processes of quantizing and encoding samples supplied thereto, divides the double sampling interval (2T) into nine time slots. The first of these, as we have seen, encompasses the mode label—the binary "1" digit 86 of wave-form L. The following eight time slots house digits (not shown) which represent the amplitude of the third sample S3. This 9-digit group proceeds through the switch 34 and over the transmission medium 54 to the receiver of FIG. 2.

The remaining samples of wave-form A will be processed and then transmitted either by way of the fast-mode circuit 20, which, as we have seen, differentially quantizes and then nonlinearly encodes samples fed thereto, or by way of the slow-mode circuit 18, which encodes the full magnitude of samples it receives. Since the operations performed upon these remaining samples are the same as those already described in connection with the first three samples, no further elaboration is necessary, and we may therefore proceed to a consideration of the receiver of FIG. 2.

*The Receiver of FIG. 2*

In FIG. 2 the pulse code transmitted from the circuit of FIG. 1 is supplied to the juncture 100. From this point the code continues to the timing circuit 102, the input 104 of AND gate 106 and to the switch 108. The timing circuit 102 may be of any conventional type well known in the art, a type that extracts timing information from the incoming pulse train. The output 110 of this timing circuit will therefore correspond to the bit rate of the incoming pulse train. Since, as we have seen, each slow-mode or fast-mode group produced by the transmitter of FIG. 1 is embraced by nine time slots whose total duration is two sampling intervals, it is necessary, if the receiver of FIG. 2 is to recognize the particular mode of transmission, that the incoming bit rate, represented by the output 110 of timing circuit 102, be reduced by a factor of nine. This reduction in frequency is accomplished by the 9:1 scaler 112, the frequency of the output 114 of which is one-ninth that of the scaler's input 110. Consequently, the input 116 of AND gate 106 is provided with a pulse train whose repetition frequency is one-ninth that of the pulse train supplied to juncture 100. Every ninth time slot, therefore, the AND gate 106 will be enabled only if a pulse appears at the juncture 100. As we have seen, a pulse will appear at such a time only if the succeeding eight digits encompass a slow-mode pulse group. If, at the time a pulse appears at the input 116 of AND gate 106, a pulse is not present at the input 104 of this AND gate, then the receiver will have ascertained that the succeeding eight digits represent a pair of fast-mode pulse groups.

As in the case of the transmitter of FIG. 1, the receiver of FIG. 2 is divided into three main parts. These are the control circuit 118, the fast-mode circuit 120 and the slow-mode circuit 122.

The control circuit 118 identifies the mode labels which precede incoming code groups as follows: The logical inverter 124 will as was mentioned in connection with the logical inverter 50 of FIG. 1, produce an output pulse whenever its inhibit input 126 is in the binary "0" state, a state which will prevail whenever the AND gate 106 is disabled. When, however, the AND gate 106 is enabled, thereby supplying a pulse to the inhibit input 126 of the logical inverter 124, the output 128 of the inverter will be in the binary "0" state. Thus, when the inverter 124 is inhibited by its input 126, pulses supplied to the input 113 of the inverter 124 will not be allowed to pass to the flip-flop circuit 130.

As we have seen, the AND gate 106 will be enabled only by a slow-mode label digit. It will not be enabled when a fast-mode label digit is received at the juncture 100, since a fast-mode label is represented by the absence of a pulse. Consequently, the output 128 of the logical inverter 124 will be in a binary "1" state—a state such as to change the sate of equilibrium of the flip-flop circuit 130—only when a fast-mode label digit (absence of a pulse) is supplied to the input 104 of AND gate 106. When the flip-flop circuit 130 changes its state of equilibrium in response to such a stimulus from the logical inverter 124, it will cause the switch 108 to connect the juncture 100 to the fast-mode circuit 120 (as is shown in FIG. 2).

When, on the other hand, a slow-mode label digit (represented by a pulse) is supplied to the input 104 of AND gate 106, the AND gate will be enabled, and the input 126 of the logical inverter 124 will be in the binary "1" state. The output 128 of the inverter will therefore be in the binary "0" state. The reset inhibit input 160 of the flip-flop circuit 130 is connected to the output 126 of AND gate 106 and, therefore, when AND gate 106 is enabled by a slow-mode label digit, the flip-flop circuit 130 will be reset by the binary "1" state of its reset input 160. When the circuit 130 is reset, the point M will be in the binary "0" state and the switch 108 will connect the juncture 100 to the slow-mode terminal 162, thereby conveying the incoming code to the slow-mode circuit 122.

It should be noted that the point M is also connected to the delay circuit 164. The delay circuit 164 provides a delay of 2T seconds or two sampling intervals. Consequently, when the flip-flop circuit 130 changes its state of equilibrium in response to the binary "1" state of its input 128, so that the point M also is in the binary "1" state, two sampling intervals thereafter the point 166 will assume the binary "1" state. A pulse thus appearing in the point 166 is differentiated by the differentiator 168 and supplied to the point U. Pulses appearing at the point U are represented by the corresponding wave-form U of FIG. 4. One sampling interval after a pulse appears at the juncture 166, the delay circuit 170 energizes the point P, which in turn connects the output switch 172 to the fast-mode circuit 120, as shown. Thus, we see that three sampling intervals after the switch 108 has been caused, by the binary "1" state of the point M, to convey the incoming pulse code to its fast-mode terminal 174, the point P finally assumes the binary "1" state and causes the output switch 172 to receive its PAM (pulse amplitude modulation) output from the point Q of the fast-mode circuit 120.

Whenever a pulse at the juncture 166, which connects the delay circuits 164 and 170, finally overcomes the delay of delay circuit 170 to appear at the point P, it will cause the switch 176 to close the circuit of the accumulator 77. As was mentioned previously in connection with the transmitter of FIG. 1, the accumulator 77 is the receiver counterpart of the transmitter accumulator 76.

Each of the impulses appearing at the point U is delayed by one sampling interval in the delay circuit 178 and then supplied to the input R of the switch 180, causing it to close momentarily. These impulses also govern the operation of the interpolator switch 196 of the slow-mode circuit 122. It should be noted that differentiation of the wave-form M (as it appears at the juncture 166) produces negative as well as positive voltage excursions. The negative ones are clipped in the differentiator 168 in a manner well known and, therefore, do not appear in the wave-form U.

When the switch 108 conveys code groups appearing at the juncture 100 into the fast-mode circuit 120 for digital-to-analog conversion, the switch 108 will be connected as shown. Digits will be delayed in the delay circuit 182 for one sampling interval and then supplied to the 4-digit decoder 184. We have seen that each fast-mode label is followed by two fast-mode pulse code groups. Consequently, the decoder 184 will be called upon to convert these groups into two successive PAM samples. Samples emanating from the decoder 184 are supplied to the delay circuit 186 and to the summing network 188, wherein they are combined with samples appearing at the juncture 190 of the interpolator circuit 192. This summation is supplied to the terminal 194 of switch 196 and will be passed on to the input 214 of the summing network 191 only if an impulse occurs at the point U.

Samples appearing at the juncture 190 are also supplied to the delay circuit 198 and thence, one sampling interval later, to the switch 180. The switch 180, as we have seen, will be closed momentarily only if an impulse (one sampling interval delayed by the delay circuit 178) occurs at the point U.

Going back to the output of the decoder 184, we see that samples therefrom are supplied to the delay circuit 186, wherein they are delayed by one sampling interval and emerge to constitute the input (see wave-form N of FIG. 4) of the three-input adder 200.

The circuit 77 is a switched accumulator and comprises the adder 200, the switch 176 and the delay circuit 202. It can be seen, in view of the operations performed by the delay circuit 202 and the adder 200, that successive samples appearing in the wave-form N are added to one another before they are supplied to the PAM output X. The same process was undertaken at the transmitter accumulator 76 (FIG. 1). The accumulator 76, as we have seen, accomplishes this adding process by means of the delay circuit 82 and the summing network 71.

It will be helpful at this point to consider the functions of the various elements of the fast-mode circuit 120. As we have seen, incoming fast-mode groups, after being recognized as such by the control circuit 118, are steered to the decoder 184 through a delay circuit 182. The decoder 184 reconstitutes the original quantized difference samples and accomplishes this end in one sampling interval.

The normal operation of the fast-mode circuit 120—i.e., not at transitions from fast to slow-mode operation, and vice versa, or during slow-mode operation—will be considered first. Normally, the switch 180 is open, as was intimated above. The summing network 188 and the delay circuit 198 are therefore inoperative. The decoded difference samples, after passing through the delay circuit 186, appear at the input N (see wave-form N of FIG. 4) of the three-input adder 200.

The adder 200 normally acts as a two-input adder, since the switch 180 is normally open. The switch 176, which is closed (as shown) by a control signal from the point P, conveys the output of the adder 200 to the delay circuit 202 and, thence, to the input 203 of the adder 200. The accumulator 77 thus produces a quantized PAM signal at the point Q by adding up successive difference samples. Since the output switch 172 connects its upper contact 211 to the output X during fast-mode operation, the quantized PAM developed at point Q is passed therethrough.

Figure 4:
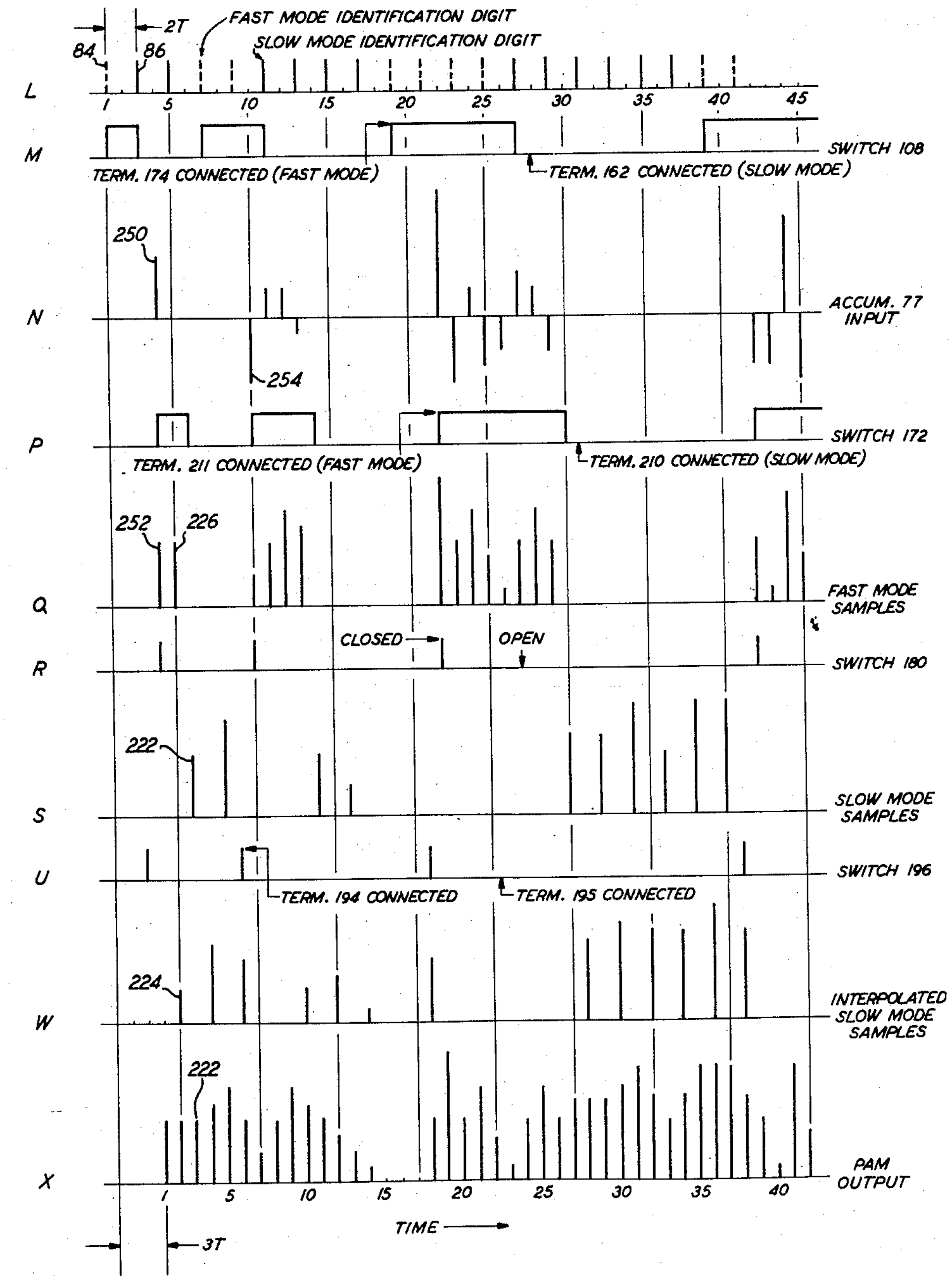
FIG. 4 is a timing diagram which relates to FIG. 2.

Note that the total delay from the PCM input of FIG. 2 to its video output is three sampling intervals (3T), whether operation is via the fast-mode circuit 120 or the slow-mode circuit 122. This delay is indicated in FIG. 4, where, for example, the first sample (so numbered) of waveform X can be seen to lag three sampling intervals behind the first mode identification digit 84 of the wave-form L. This delay is provided in the fast-mode circuit 120 by the delay circuits 182 and 186 and by the four-digit decoder 184, which requires one sampling interval to decode each fast-mode group it receives. The delay circuits 182 and 186 are inserted to render the delay encountered in the fast-mode circuit 120 the same as that encountered in the slow-mode circuit 122. The 8-digit decoder 204 of the slow-mode circuit 122 requires a period of 2T seconds to decode each slow-mode group it receives. In addition, the delay circuit 208 provides a delay of T seconds for the interpolation process performed by the interpolator 192. This process will be described subsequently.

We have discussed the normal operation of the fast-mode circuit 120. Let us now consider its activity when slow-mode decoding is called for. In this case, the accumulator 77 is interrupted. If it were not interrupted, it would continue circulating the last fast-mode sample value (before the commencement of slow-mode operation) maintaining it throughout the slow-mode operating period and, when fast-mode operation was again required, the adder 200 would add incoming difference samples to that retained value. The output Q of the accumulator 77 would therefore be in error. This result is avoided by opening the switch 176 at the same time that the output switch 172 is thrown to its slow-mode terminal 210. Both switches operate in response to the voltage level of point P—in this case, when the voltage of point P falls (see wave-form P of FIG. 4). It should be noted at this point that although, for ease of narration, the operations of the various switches of FIGS. 1 and 2 are described in a mechanical sense, they are in each case fast-acting electronic switches of an appropriate type well known in the art.

The transition from slow-mode to fast-mode operation remains to be considered. When such a transition occurs, the accumulator 77 begins its operation by employing the last slow-mode sample appearing at the juncture 190 of the slow-mode circuit 122. This sample proceeds from the juncture 190, through the delay circuit 198 and the switch 180 (which is closed by an impulse of the wave-form R), and then into the input 205 of the adder 200. The delay circuit 198 is inserted to render simultaneous the arrivals at the adder 200 of the first difference sample (at the input N) and the last slow-mode sample (at the input 205).

It will be recalled that the last slow-mode sample of each slow-mode cycle was used with the next-occurring sample to produce a "double difference" sample at the subtractor 90 of FIG. 1. Accordingly, the reverse process is required at the receiver of FIG. 2. Therefore, the accumulator 77 begins a fast-mode cycle by employing the last slow-mode sample received. Thus, for example, note that the sample 250 of the wave-form N (FIG. 4) represents the sample 140 of the wave-form J (FIG 3). The sample 140, as we have seen, was produced by subtracting, from the first sample of wave-form A, the slow-mode sample (of assumed zero amplitude) that occurred two sampling intervals before. Accordingly, at the receiver the first fast-mode sample 250 is added, in the adder 200, to the last-occurring slow-mode sample (which is zero) to produce the sample 252 of wave-form Q. As another example, the sample 254 of wave-form N represents the sample 256 of wave-form J (FIG. 3). Note that the sample 256 occurs three sampling intervals before the advent of the sample 254, a delay imposed by the delay circuits 182 and 186 and the four-digit decoder 184. The sample 256 was produced by subtracting the sample 258 of the wave-form A from the sample 260. The sample 260 is the first fast-mode sample in the cycle identified as fast-mode by the mode digit 262 of wave-form L (FIG. 3).

In addition, when a transition from slow-to-fast-mode operation takes place, the summing network 188 supplies the slow-mode interpolator 192 with the first fast-mode sample that emerges from the decoder 184. The reason for this will be explained later.

When the flip-flop circuit 130 of the control circuit 118 is reset in response to a slow-mode label digit, the point M reverts to the binary "0" state and the switch 108 is caused to connect the juncture 100 to its slow-mode terminal 162. The slow-mode pulse group which immediately follows this slow-mode label digit is supplied to the decoder 204, wherein it is converted to analog form. The PAM sample thus produced is supplied to the switch 196, the delay circuit 206, and the delay circuit 208. This sample proceeds through the switch 196 and is added in the summing network 191 to any sample that may have preceded it by two sampling intervals, a delay provided by the delay circuit 206.

It should be noted that the PAM output X of the switch 172 must be a succession of samples occurring at the original sampling rate. This output is represented by the wave-form X of FIG. 4, the samples of which are derived from the wave-form Q or from a combination of the wave-forms W and S. In order to produce this output is represented by the wave-form X of FIG. 4, the samples of which are derived from the wave-form Q or from a combination of the wave-forms W and S. In order to produce this output, an interpolation process is necessary to convert the slow-mode samples—which, as we have seen, occur every two sampling intervals—into a train of samples occurring every sampling interval. This conversion process is accomplished by the interpolartor 192 which takes any two successive samples from the decoder 204, ascertains their average value, and inserts this average midway between them. The process is accomplished as follows:

The first sample (not shown in FIG. 4) coming out of the decoder 204 appears one sampling interval later (a delay imposed by the delay circuit 208) at the input S of the summing network 220. This sample is represented by the sample 222 of wave-form S in FIG. 4. At this time there is no signal at the summnig network's input W and, therefore, the sample 222 appears unaltered at the output X, the switch 172 in the meantime having been switched to its lower terminal 210 by the control circuit 118.

It should be noted that the aforementioned first sample also proceeded through the switch 196 by way of its terminal 195, and thence (through the summing network 191, the attenuator 212 and the summing network 220) to the terminal 210 of the switch 172, appearing there as the sample 224 of wave-form W. This process occurred one sampling interval before the process by which the first sample was conveyed through the delay circuit 208 and the summing network 220 to the PAM output X. Thus, before the first sample was transmitted in its entirety as the sample 222 to the output X, it was halved in the attenuator 212 and passed on to the terminal 210 of switch 172, appearing there as the sample 224 of wave-form W. But since the switch 172 was not connected to the terminal 210 at that time, the sample 224 could not be conveyed to the PAM output X. FIG. 4 shows that the fast-mode sample 226 of wave-form Q constitutes the second sample of the output wave-form X, every fifth sample of which is numbered for convenience. Wave-form P shows that the fast-mode sample 226 was passed on to the PAM output X, to the exclusion of the slow-mode sample 224, because the terminal 211 was in contact with the output X at that time.

It should be noted that the wave-form P, which represents the output voltage level (three sampling intervals delayed) of the flip-flop circuit 130, has been used to show the switch positions of the output switch 172. The higher voltage level indicates that the fast-mode terminal 211 is in contact, while the lower level indicates contact with the slow-mode terminal 210. As can be seen, the delay circuits 164 and 170, together provide a delay of three sampling intervals between the point M and the input P of the switch 172. A comparison of the wave-forms M and P shows this graphically. A similar descriptive aid has been employed in connection with the wave-forms E and H of FIG. 3 and the wave-forms M, R and U of FIG. 4.

At the time the first slow-mode sample, produced by the decoder 204, finally overcomes the 2T delay of the delay circuit 206 and appears at the summing network 191, the second slow-mode sample being processed by the decoder 206 will have been conveyed through the terminal 195 of the switch 196 to the input 214 of the summing network 191. The sum of these first and second samples will appear at the output 216 of the summing network 191. This sum will then be halved by the attenuator 212, so that the average value of the aforementioned first and second samples appears at the input W of the summing network 220. This average value is the interpolated sample and appears between the first and second samples. The further processes in which the second slow-mode sample takes part are similar to those already undertaken for an interpolation between the first and second samples.

It should be noted, however, that the last interpolation before a transition from slow-mode operation to fast-mode operation would, without other provision, produce a sample equal to one-half of the sum of the last slow-mode sample and zero. This interpolation obviously would be erroneous. In order to avoid such error, the first fast-mode sample that appears at the output of the summing network 188 of the fast-mode circuit 120 is supplied by way of the switch 196 to the input 214 of the summing network 191, where it is added to the last slow-mode sample and then divided by two in the attenuator 212. In this manner, the output W of the attenuator 212 represents a more reasonable interpolation.

The utilization of the first fast-mode sample to make the last interpolation of a slow-mode cycle is accomplished by the switch 196. The switch 196 is normally connected to the terminal 195 as shown. When a command signal occurs at the point U, the switch 196 will switch over momentarily to the terminal 194, pick up the fast-mode sample from the summing network 188, and deliver this sample to the summing network 191. The switch 196 will then return to its normal position, connecting the summing network 191 to the terminal 195. The interpolator 192 is now ready for the next slow-mode cycle.

We have seen how the control circuit 118, responsive to incoming mode identification digits, directs code traffic to either the fast-mode circuit 120 or the slow-mode circuit 122, selectively activating one or the other by means of its switches 108 and 172. We have also seen how the control circuit 118, in conjunction with the switches 180 and 196, governs transitions from slow to fast-mode operation and from fast to slow-mode operation. Finally we have considered the manner in which the circuits 120 and 122 convert incoming PCM to PAM.

It is understood, but not shown in FIG. 2, that the PAM output X is fed into a low-pass filter, identical to low-pass filter 10 of FIG. 1, which reconstructs at its output the original video signal as accurately as permitted by the quantization processes.

The advantages of the invention over dual-mode schemes where both modes involve full-range quantization of samples have already been alluded to. One of the advantages of the invention's dual-mode scheme over schemes employing differential quantization for both modes (e.g., see the system of the above-cited Graham article) is the improved suppression of error propagation. It is inherent in the process of differential quantization that if any error develops, it will be maintained until the true value of the message signal is again established. In television processing, an error occurring at any point in a scanning line would be maintained throughout the remainder of the line. Re-establishment of the true signal value would occur at the end of each scanning line. Because of this inherent potential for repetitive error, error-correcting schemes are necessary. See, for example, the above-cited Graham article. But, in accordance with the invention, which utilizes differential quantization for the fast-mode only, if an error occurs, the true value of the massage signal will be re-established at the next fast-to-slow mode transition. Thus, the propagation of any errors that may occur is confined to fast-mode operation, i.e., to picture regions of detail or of abrupt changes in luminance, where errors are least noticeable to the eye.

Another advantage of the invention is that if, for any reason, the fast-mode circuitry should fail or become inoperative, the system could easily be made to lock in the slow-mode. By such an expedient a low resolution picture could still be made available for transmission. The system could also be made to lock in the fast-mode should the slow-mode circuitry fail. But this would entail forfeiture of the aforementioned improvement in the suppression of fast-mode error propagation, since there would be no transitions from differential quantization (fast-mode) to full-amplitude quantization (slow-mode).

As far as implementation of the invention is concerned, it should be noted that no critical or excessively complicated elements are used in the illustrative embodiments which have been described. It is necessary, however, in view of the rapidity with which the analog-to-digital conversion of video signals must take place, that all elements operate with dispatch. This requirement is well within the present capabilities of the art.

While the invention has been described with reference to specific embodiments, these should be understood as illustrative of the invention, and not as a limitation on its spirit and scope.

What is claimed is:

1. A system for the pulse-code transmission of message signals comprising a source of message signals, means for ampling said signals, and a transmission medium; differential encoding means interconnecting said sampling means and said transmission medium, full-amplitude encoding means connected in parallel with said differential encoding means and also interconnecting said sampling means and said transmission medium, comparator means for periodically determining the rate of change of said signals, and means selectively activating only one of said encoding means in accordance with the rate-of-change determination of said comparator means.

2. A system for the pulse-code transmission of message signals, comprising means for periodically sampling said signals to produce a succession of samples, first coding means for differentially quantizing and encoding samples supplied thereto by said sampling means, second coding means for quantizing and encoding the full amplitude of periodically selected ones of the samples supplied thereto by said sampling means, and control means for selecting the output of only one of said coding means at any given time for transmission over said system.

3. A system for the pulse-code transmission of message signals, comprising means for periodically sampling said message signals to produce a succession of samples, first coding means for periodically encoding less than every one of said succession of samples, means for subtracting each of said succession of samples from the sample next preceding it to produce a train of difference samples, second coding means for encoding each of said difference samples, and control means for determining which of said coding means shall be used to produce the code representation of the samples produced by said sampling means.

4. A system in accordance with claim 3, wherein said sampling means is preceded by a low-pass filter through which said message signals are supplied, and wherein said sampling means includes means for sampling said message signals at a rate of twice the highest frequency passed by said filter, said system further comprising means for timing the sampling rate of said sampling means.

5. A system for the conversion of images to electrical signals and thence to a pulse code, comprising means for sampling said signals to produce a succession of periodically recurrent samples, first coding means for encoding every other one of said succession of samples, means for subtracting each of said succession of samples from its next preceding neighbor to produce a train of difference samples, second coding means for encoding each of said difference samples, and means, responsive to the magnitude of the difference between any two samples, for transmitting the code representation of the latter of said two samples over said system via only one of said coding means.

6. The system of claim 5 in which said second coding means includes means for nonlinearly quantizing said difference samples prior to encoding.

7. The system of claim 5 in which said first coding means includes means for converting the numerical value of its incoming samples to a code of 2N digits, and in which said second coding means includes means for converting the numerical value of its incoming difference samples to a code of N digits.

8. A system for the conversion of images to electrical signals and thence to a pulse code, comprising means for periodically sampling said signals to produce a succession of samples, first coding means for differentially quantizing and encoding samples supplied thereto from said sampling means, second coding means for quantizing and encoding the full amplitude of samples supplied thereto from said sampling means, a receiver, means for transmitting pulse code to said receiver, and control means for connecting only one of said coding means to said transmitting means at any given time.

9. A system for the pulse-code transmission of message signals, comprising means for periodically sampling said message signals to produce a succession of samples, first coding means for differentially quantizing and encoding samples supplied thereto by said sampling means, second coding means for quantizing and encoding the full amplitude of periodically-selected ones of the samples supplied thereto by said sampling means, a receiver, means for transmitting pulse code to said receiver, each of said first and second coding means comprising means for generating source identification digits to inform said receiver of the coding means from which pulse code is transmitted to said receiver, and control means for connecting only one of said coding means to said transmitting means for the transmission of pulse code to said receiver at any given time.

10. A system in accordance with claim 9, wherein said receiver comprises means for extracting timing information from said transmitted pulse code, first decoding means for decoding pulse code produced by said first coding means, second decoding means for decoding pulse code produced by said second coding means, and means responsive to said source identification digits for routing pulse code from said first coding means to said first decoding means and pulse code from said second coding means to said second decoding means.

11. A pulse code transmission system comprising a transmitter, a receiver, and a transmission medium interconnecting said transmitter and receiver; said transmitter comprising: a source of message signals, means for sampling said signals, differential encoding means interconnecting said sampling means and said transmission medium, full-amplitude encoding means connected in parallel with said differential encoding means and also interconnecting said sampling means and said transmission medium, comparator means for periodically determining the rate of change of said message signals, and means selectively activating only one of said encoding means in accordance with the rate-of-change determination of said comparator means, each of said encoding means comprising means for generating identification digits to inform said receiver as to which of said encoding means has been activated at any given time; and said receiver comprising: first decoding means for decoding samples encoded in said differential encoding means, second decoding means for decoding samples encoded in said full-amplitude encoding means, and means responsive to said identification digits for selectively activating only one of said decoding means.

No references cited.